United States Patent
Radwan et al.

[11] Patent Number: 5,485,328
[45] Date of Patent: Jan. 16, 1996

[54] SYSTEM FOR REMOVING A CLAMP FROM A DISC DRIVE HUB ASSEMBLY

[75] Inventors: Hatem R. Radwan, San Jose; Bradley D. Kelemen, Santa Cruz, both of Calif.

[73] Assignee: Seagate Technology, Inc., Scotts Valley, Calif.

[21] Appl. No.: 237,774

[22] Filed: May 4, 1994

[51] Int. Cl.$^6$ .................................................. G11B 17/08
[52] U.S. Cl. ........................... 360/98.08; 360/99.12
[58] Field of Search ................ 360/98.08, 99.12; 29/762, 764

[56] References Cited

U.S. PATENT DOCUMENTS

| | | | |
|---|---|---|---|
| 4,639,802 | 1/1987 | Neubauer et al. | 360/98 |
| 4,910,620 | 3/1990 | Olbrich | 360/98.08 |
| 5,075,808 | 12/1991 | Johnson | 360/98.08 |
| 5,101,306 | 3/1992 | Johnson | 360/98.12 |
| 5,249,090 | 9/1993 | Fehse | 360/98.08 |

Primary Examiner—A. J. Heinz
Attorney, Agent, or Firm—Westman, Champlin & Kelly

[57] ABSTRACT

A hub has a disc concentrically mounted about the hub for rotation with the hub. The hub has a body portion with a first axial end, a second axial end and a surface extending between the first and second axial ends. A flange is disposed at the second axial end of the hub and supports the magnetic disc. A clamp is disposed about the body portion of the hub proximate the first axial end of the hub. The clamp and the flange clamp the disc for rotation with the hub. The first axial end of the hub includes a sufficient number of slots communicating with an inner surface of the clamp such that the clamp is removable by applying a radial force to the inner surface of the clamp through the slots to attain a minimum radial displacement of the clamp which exceeds a maximum radial interference between the hub and the clamp and such that strain induced in the clamp is less than a desired percent so the clamp remains unbroken upon being radially displaced.

20 Claims, 9 Drawing Sheets

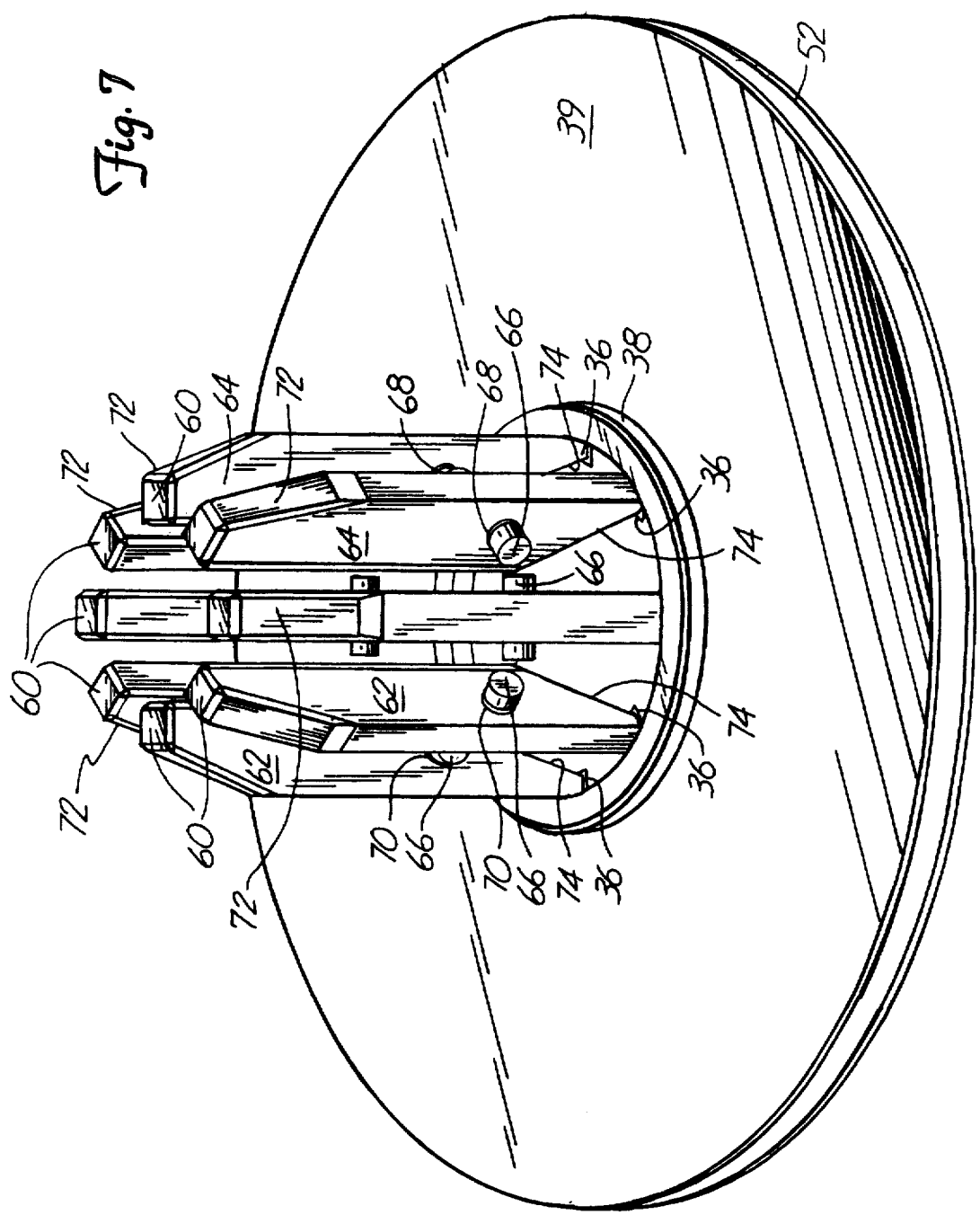

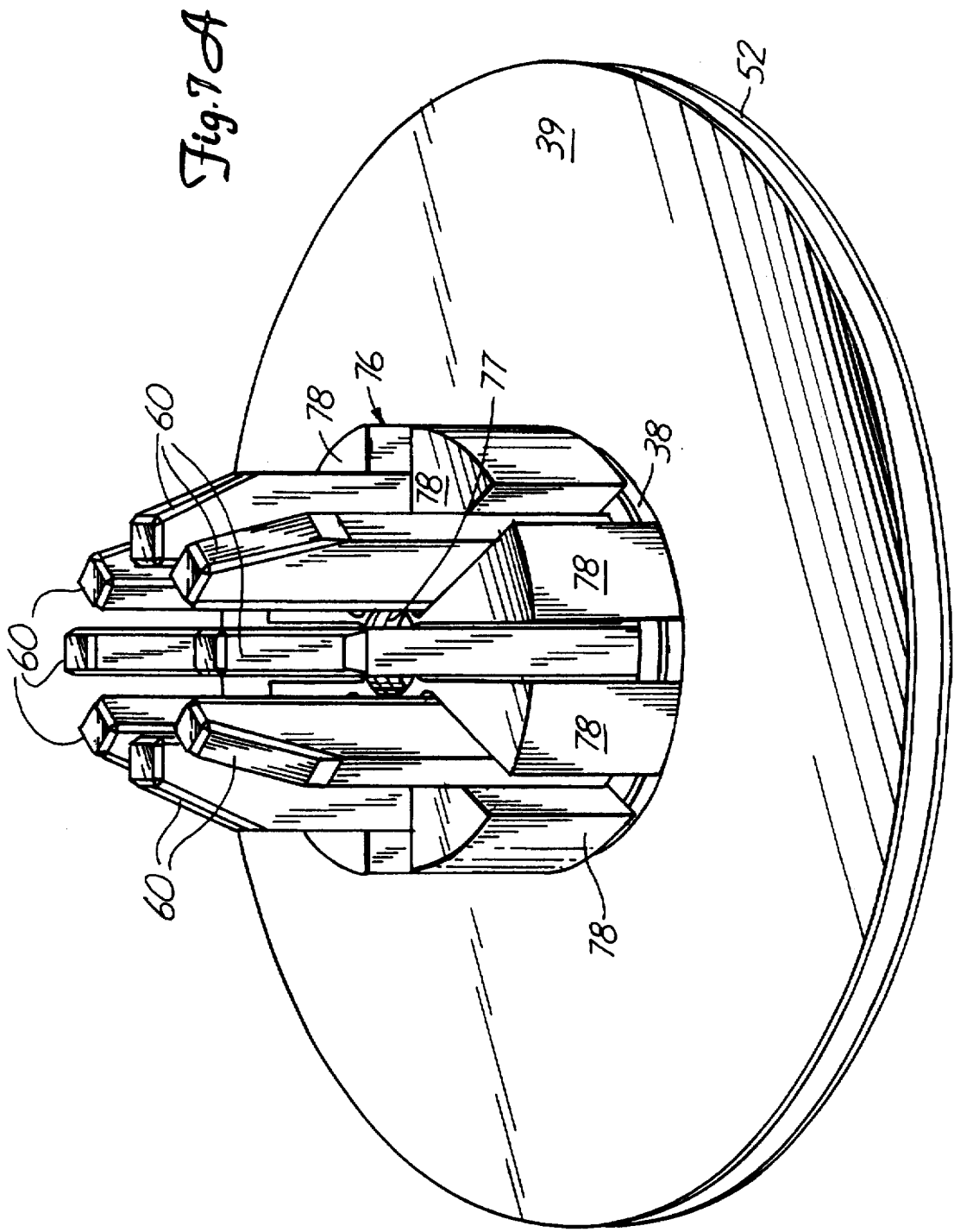

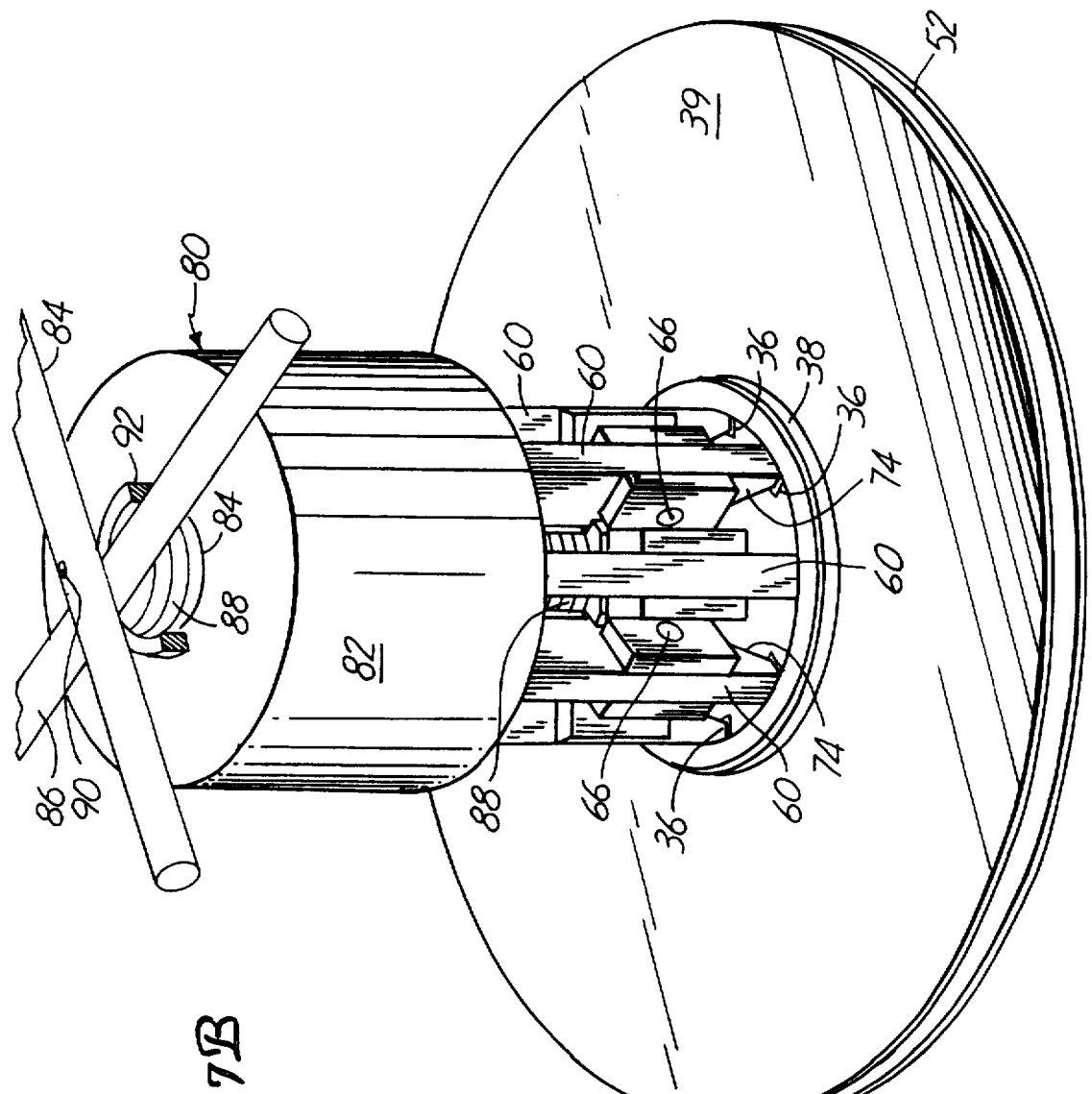

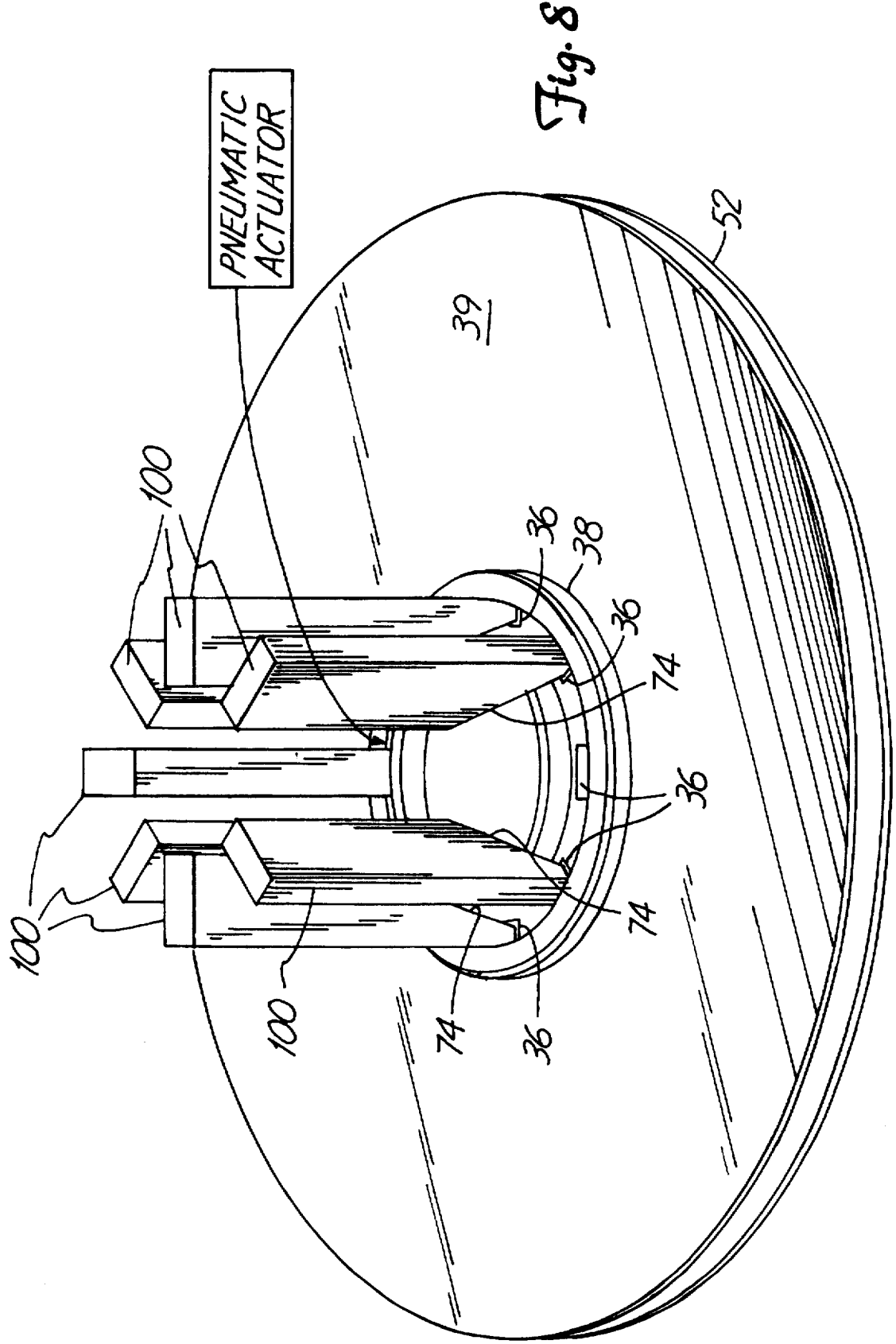

SYSTEM FOR REMOVING A CLAMP FROM A DISC DRIVE HUB ASSEMBLY

BACKGROUND OF THE INVENTION

The present invention pertains to disc drives. More particularly, the present invention pertains to a removal system for removing a clamp from a hub in a disc drive.

A typical disc drive includes one or more magnetic discs mounted for rotation on a hub or spindle. Where more than one magnetic disc is used, the discs are spaced apart from one another axially along the hub by spacers mounted between the discs. Conventional hubs typically include a flange portion which extends from one of the axial ends of the hub. The discs and spacers are placed concentrically about the hub and supported by the flange portion of the hub. The plurality of magnetic discs and the spacers are clamped down onto the flange portion of the hub using a clamp which is placed on the axial end of the hub, opposite the flange. Thus, the discs and spacers are all clamped to the hub for rotation with the hub about an axis of rotation generally defined by the radial center of the hub.

A typical magnetic disc drive also includes a transducer supported by a hydrodynamic air bearing which flies above each magnetic disc. The transducer and the hydrodynamic air bearing are collectively referred to as a data head. A drive controller is conventionally used for controlling the disc drive system based on commands received from the host system. The drive controller controls the disc drive to retrieve information form the magnetic discs and to store information on the magnetic discs.

An electromechanical actuator operates within a negative feedback, closed-loop servo system. The actuator moves the data head radially over the disc surface for track seek operations and holds the transducer directly over a track on the disc surface for track following operations.

Information is typically stored on the magnetic discs by providing a write signal to the data head to encode flux reversals on the surface of the magnetic disc representing the data to be stored. In retrieving data-from the disc, the drive controller controls the electromechanical actuator so that the data head flies above the magnetic disc, sensing the flux reversals on the magnetic disc, and generating a read signal based on those flux reversals. The read signal is then decoded by the drive controller to recover the data represented by flux reversals stored on the magnetic disc, and consequently represented in the read signal provided by the data head.

As industry pressure requires disc drives to be reduced in size, the axial height of the hub, and consequently the axial height of the entire disc file, becomes critical. In past systems, the clamp used to hold the discs about the hub was screwed onto the hub with screws running in the axial direction. However, since the axial height of the hub has become critical, the screws used to fasten the clamp to the hub take up an undesirable amount of axial space.

Therefore, a heat shrink clamp was developed. Such a clamp is described in greater detail in U.S. Pat. No. 4,639,802. Such clamps typically include a clamp ring which has an inner diameter that is slightly smaller than the outer diameter of one axial end of the hub. The clamp ring is responsive to thermal energy and expands when thermal energy is applied to it and contracts when thermal energy is removed from it. Therefore, to assemble the clamp ring onto the hub, the clamp ring is first heated, thereby expanding it such that the inner diameter of the clamp ring is slightly larger than the outer diameter of the hub. The clamp ring is then placed about the hub and allowed to cool to establish a frictional or interference fit with the outer surface of the hub.

Just prior to placing the clamp on the hub, the plurality of discs and spacers arranged about the hub are subjected to an axial load. The clamp ring is put in place and allowed to form its frictional fit before the axial load is removed. Thus, the clamp ring clamps the spacers and the magnetic discs to the flange located at the second axial end of the hub.

At times, disc drives fail or need to be disassembled for inspection, or for other purposes. To remove thermally responsive clamps, a number of slots have traditionally been located in the first axial end of the hub about which the clamp is disposed. The slots communicate with the inner radial surface of the hub. A removal tool includes a number of fingers which corresponds to the number of slots in the hub. The fingers are positioned such that they mate with the slots in the first axial end of the hub, and a radial displacement is applied to the inner surface of the clamp by radially pivoting the fingers of the removal tool radially outward. This radial displacement is intended to enlarge the clamp so that its inner diameter is larger than the outer diameter of the hub, and so that the clamp can be removed.

However, in conventional removal systems, the number of slots in the hub, and consequently the number of corresponding fingers on the removal tool, is arbitrarily set at six. With only six slots and fingers, the performance of such a removal system is, at best, undesirable, and at worst, unacceptable, for many disc drives. With only six slots and fingers, the practical maximum attainable minimum radial expansion of the clamp is often less than the maximum radial interference between the inner surface of the clamp and the outer surface of the hub. The radial displacement also often induces large strains in the clamp.

Thus, with only six slots and fingers, there is a high degree of likelihood that the clamp will break during the removal process. When the clamp breaks, particles generated by the breakage disperse throughout the disc drive contaminating not only the data head assembly, but also the storage media. Such contaminated drives must be discarded as unusable.

SUMMARY OF THE INVENTION

The present invention arises from the realization that, in smaller diameter disc drives in particular, there is a need to precisely determine an adequate number of slots and fingers used in a removal system to attain acceptable performance in removing thermally responsive clamps from the hub assembly. The same need also arises in larger drives.

A hub in a disc drive has a magnetic disc concentrically mounted about the hub for rotation with the hub. The hub has a generally cylindrical body portion with a first axial end, a second axial end and a generally cylindrical surface extending between the first and second axial ends. A flange is disposed generally at the second axial end of the hub, and the flange supports the magnetic disc. A clamp is generally concentrically disposed about the body portion of the hub proximate the first axial end of the hub. The clamp and the flange subject the disc to opposing axial forces to clamp the disc for rotation with the hub. The first axial end of the hub includes a sufficient number of slots communicating with an inner surface of the clamp such that the clamp is removable by applying a radial force to the inner surface of the clamp through the slots to attain a minimum radial displacement of the clamp which exceeds a maximum radial interference between the hub and the clamp and such that strain induced in the clamp is less than a desired percent so the clamp remains unbroken upon being radially displaced by the minimum radial displacement.

BRIEF DESCRIPTION OF THE DRAWINGS

FIGS. 7, 7A and 7B show a hub assembly of the present invention used with a removal tool according to the present invention.

FIG. 8 shows a second embodiment of a removal tool according to the present invention.

DETAILED DESCRIPTION OF THE PREFERRED EMBODIMENTS

Figure 1:
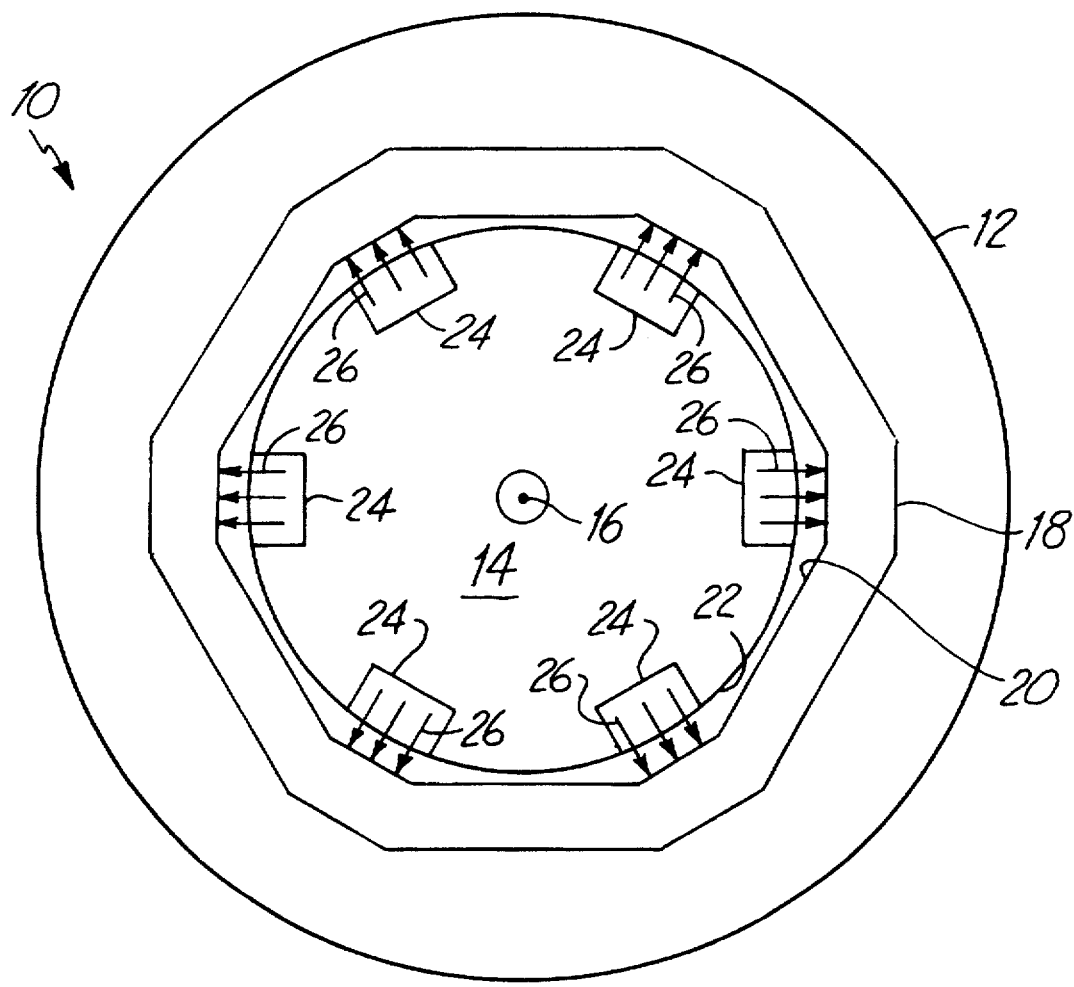
FIG. 1 is a top view of a hub and clamp of the prior art.

FIG. 1 is a top view of a portion of a hub assembly 10 of the prior art. Hub assembly 10 includes one or more discs 12 concentrically mounted about hub 14. Hub 14 is mounted for rotation about axis 16. Clamp 18 is clamped at one axial end of hub 14 to clamp disc 12 for rotation with hub 14. Clamp 18 is a known thermally responsive clamp which has an inner surface 20 with a diameter which is slightly smaller than the diameter of outer surface 22 of hub 14. For assembly, clamp 18 is heated so that its inner surface 20 expands to be larger than the outer surface 22 of hub 14. Clamp 18 is then placed over hub 14 and allowed to cool at which time its inner surface 20 shrinks back to its original size so that it engages the outer surface 22 of hub 14 to form a frictional or interference fit with hub 14.

Six slots 24 are provided about the periphery of one of the axial ends of hub 14. Slots 24 extend from an inner radius of hub 14 to the exterior surface 22 of hub 14, and communicate with the inner surface 20 of clamp 18. In order to remove clamp 18 from hub 14, a removal tool (which is described in greater detail later in the specification), which has six fingers, is positioned so that the fingers mate with slots 24. The fingers of the removal tool then engage the inner surface 20 of clamp 18 and exert a radial force on clamp 18 indicated by arrows 26. Upon exertion of great enough radial force, the fingers impart a radial displacement to clamp 18 causing clamp 18 to expand. The radial displacement is provided in an attempt to have clamp 18 expand enough such that the inner surface 20 achieves a sufficient radial displacement to be larger than the interference between surface 20 of clamp 18 and surface 22 of hub 14. If such expansion is achieved, clamp 18 can be removed from hub 14.

Figure 2:
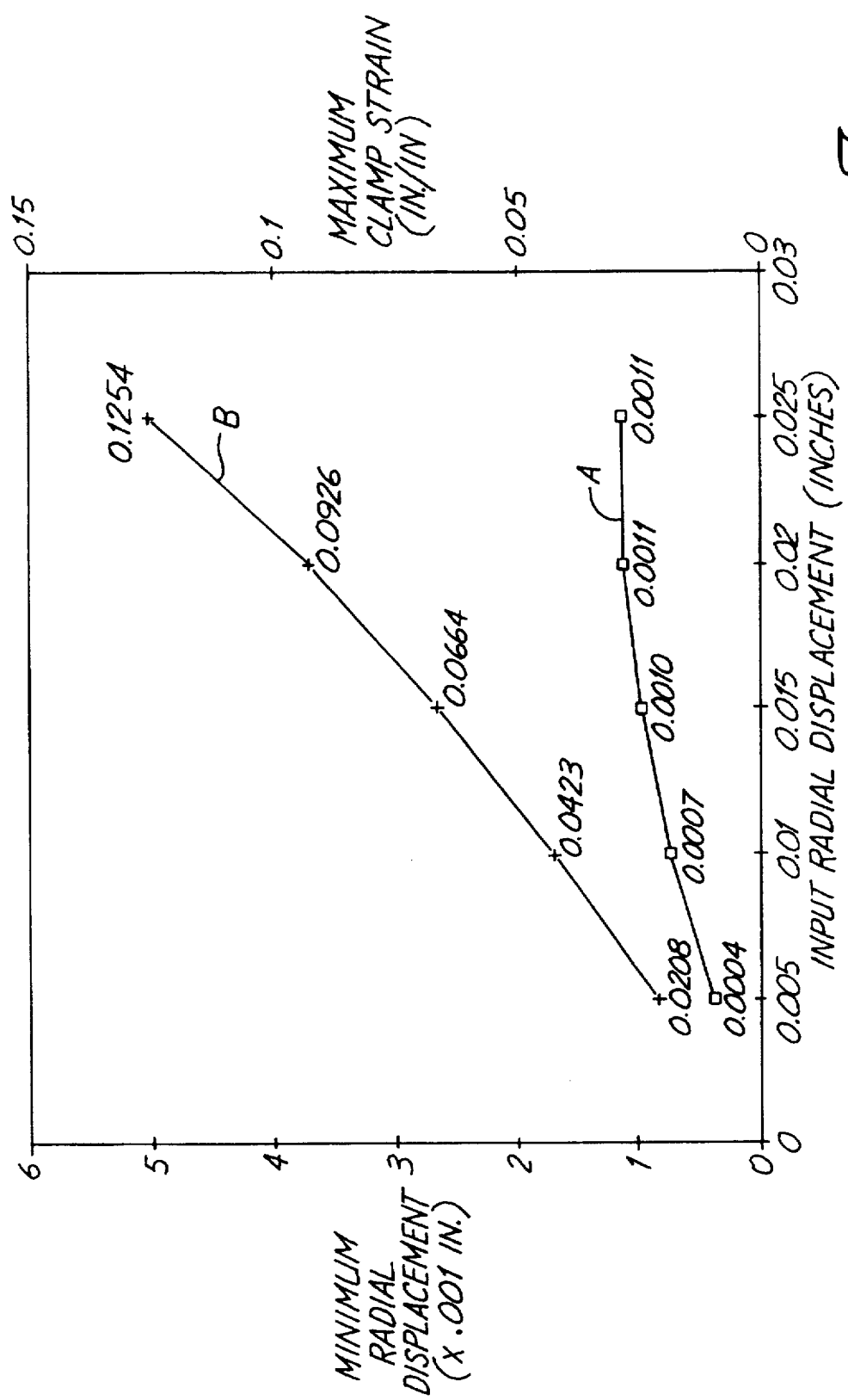
FIG. 2 is a graph showing clamp strain, input radial displacement and minimum clamp radial displacement for the hub and clamp shown in FIG. 1 in which the clamp material is typical stainless steel and the hub has typical slot widths.

However, FIG. 2 is a graph of input radial displacement by the fingers of the removal tool, versus minimum radial displacement of the clamp 18, versus maximum clamp strain in clamp 18 induced by the input radial displacement for a disc drive having discs with approximately a 2.5 inch diameter, and in which the diameter of hub 114 is approximately 0.78 inches. The clamp 18 is formed of conventional stainless steel material and the slot widths are typical. The graph shown in FIG. 2 was obtained by conducting computerized finite element analysis and stress analysis on the hub 14 and clamp 18. The stress analysis and finite element analysis were performed using well known, commercially available, computer software for performing finite element analysis identified by the commercial designation ANSYS provided from Swanson Analysis Systems of Houston, Pa. While the maximum clamp strain can typically be roughly obtained by dividing the amount of radial displacement in the clamp by the radius of the clamp, this is inadequate in accurately determining the number of slots required. A much more accurate representation is obtained using the finite element analysis computer software, accounting for nonlinear material yielding.

FIG. 2 shows that, with six fingers in the removal tool mating with only six slots in the hub, the fingers provide an input radial movement (or radial displacement) of 0.02 inches. The maximum attainable minimum expansion of clamp 18, based upon the input radial displacement, was only approximately 0.0011 inches. The maximum attainable minimum expansion against input radial displacement is graphed along line A in FIG. 2. This radial displacement induced a strain in clamp 18 of approximately 9.3%. The maximum clamp strain is graphed along line B in FIG. 2. In this example, clamp strains even much larger than 12.5% are needed to be able to consistently remove the clamp 18 from the hub.

However, the maximum radial interference between clamp 18 and hub 14 during a typical interference fit is 0.0015 inches. Since the maximum attainable minimum expansion of clamp 18 is only 0.0011 inches, and this is achieved at a strain in clamp 18 of approximately 9.3%, there is only little chance that hub 14, with only six slots, will allow for consistently removing clamp 18 without breaking it.

It has been determined that the clamp strain should not exceed approximately 10% for typical suitable materials, in attempting radial expansion of clamp 18, or breakage of clamp 18 is almost certain. Even when clamp 18 is formed of materials having significantly higher ductility in the transverse direction, removal of the clamp is still difficult to attain consistently. Breakage of clamp 18 generates particles which contaminate both the data head and the magnetic storage media (disc 12) thereby rendering them useless.

In order to achieve any type of workable system using the prior art methods shown in FIGS. 1 and 2, extremely tight tolerances must be maintained in the hub 14 and clamp 18. Maintaining such tolerances is very costly. In addition, clamp 18 must be manufactured using a material having high ductility in the transverse direction, which excludes free machining steels. Such materials are more expensive and difficult to machine. In addition, the removal tool used to exert the radial displacement on clamp 18 must exert a high degree of force to obtain the required large radial displacement. Therefore, the removal tool is subject to greater wear and shorter life, or breakage.

Figure 3:
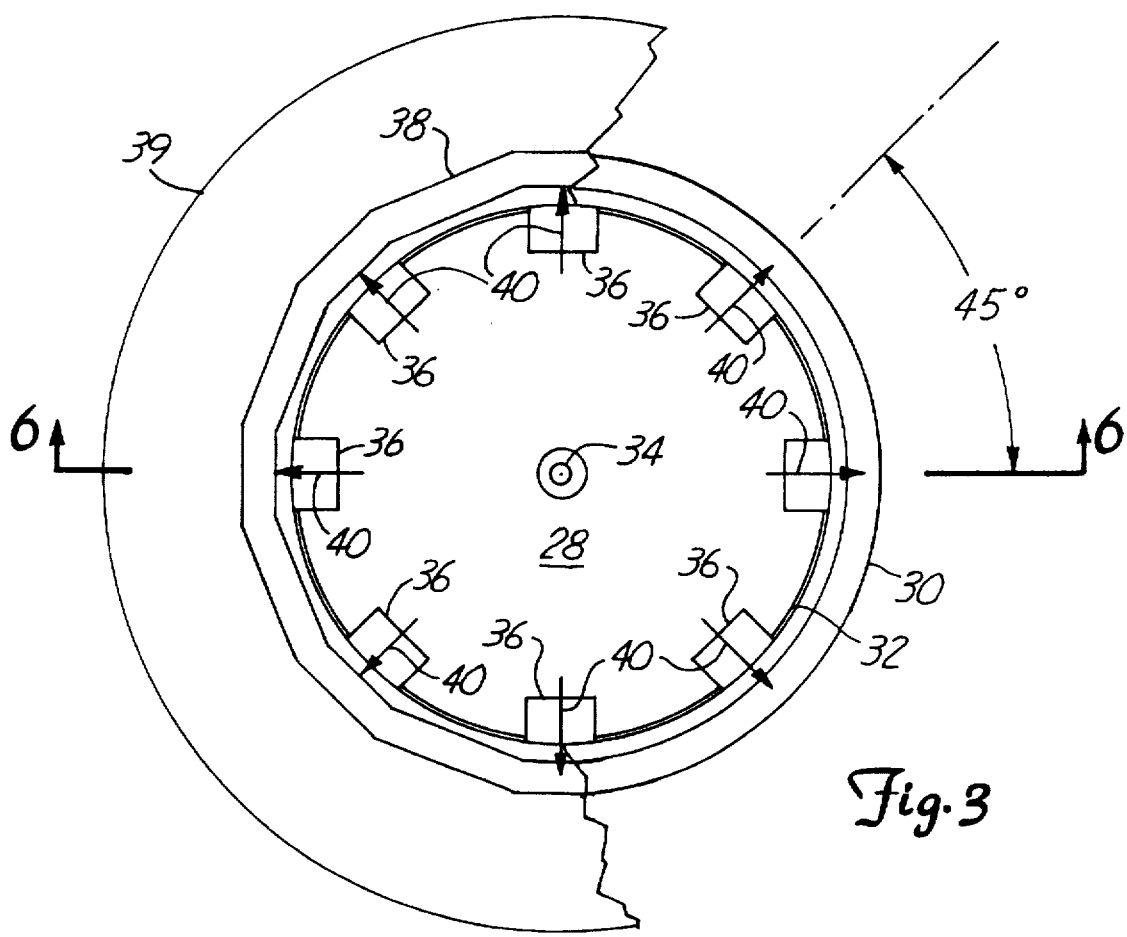
FIG. 3 is a top view of a hub according to the present invention.

FIG. 3 is a top view of hub 28 according to the present invention. Hub 28 has a flange 30 formed at one axial end thereof. A magnetic media disc 39 is supported by flange 30, and a thermally responsive clamp 38 is clamped about the opposite axial end 32 of hub 28. Clamp 38 and disc 39 are partially cut away in FIG. 3 for the sake of clarity. Hub 28 is mounted for rotation about axis 34.

In the preferred embodiment shown in FIG. 3, hub 28 has a diameter of approximately 0.78 inches, and it supports one or more magnetic media discs having a diameter of approximately 2.5 inches. The first axial end 32 of hub 28 is also provided with eight slots 36. Finite element analysis performed on hub 28 and clamp 38 associated with hub 28 shows that at least seven slots must be used in order to achieve sufficient performance in removal of clamp 38. The removal tool has eight fingers which correspond to the eight slots 36 on the first axial end 32 of hub 28. The eight fingers are positioned to mate with slots 36 and exert a radial force on clamp 38, thus applying a radial displacement to clamp 38. The radial force is indicated by arrows 40, and the removal tool is described in greater detail with respect to FIGS. 7, 7A and 7B.

Figure 4:
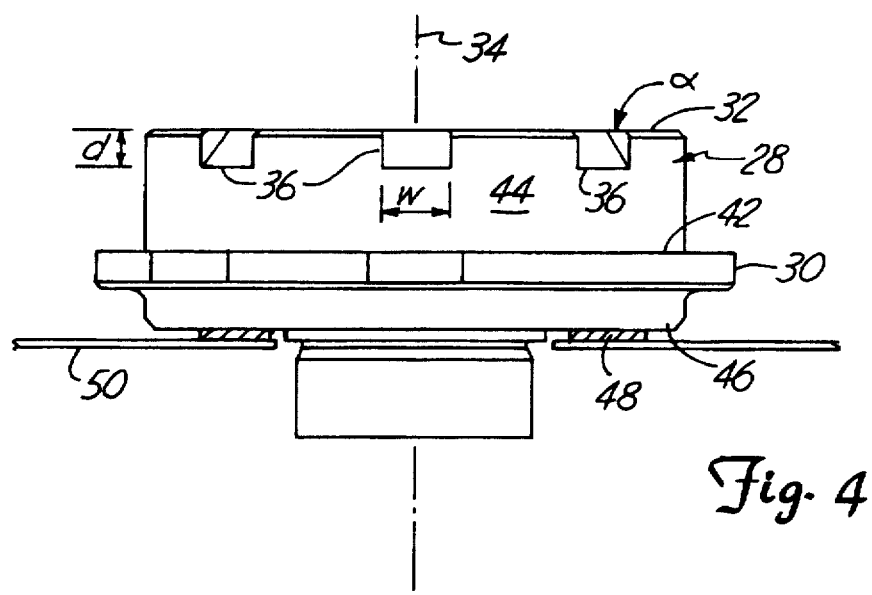
FIG. 4 is a side view of the hub shown in FIG. 3.

FIG. 4 is a side view of hub 28 with both clamp 38 and disc 39 removed for the sake of clarity. FIG. 4 shows that flange 30 is disposed generally at a second axial end 42 of hub 28. A generally cylindrical body portion 44 extends between the first axial end 32 and the second axial end 42 of hub 28. In a preferred embodiment, the body portion 44 and the flange 30 are formed integrally with one another. FIG. 4 also shows that flange 30 has a lower surface 46 which is coupled by a bearing 48 for rotation about axis 34 relative to a base plate 50.

In the preferred embodiment shown in FIGS. 3 and 4, each of the slots 36 are dimensioned to mate with the corresponding fingers on the removal tool. In the preferred embodiment, each of the slots 36 have a width W which is approximately 0.100 inches. In addition, slots 36 extend from an inner radius of hub 28 to the external surface of hub 28 and extend downwardly from the first axial end 32 of hub 28 at an angle α which is preferably approximately 45°. Slots 36 also each have a depth d which, in the preferred embodiment, is approximately 0.063 inches, slightly larger than thickness of the clamp. Finally, in the preferred embodiment, the slots 36 are angularly displaced about the outer radius of hub 28 at equal distances. In the preferred embodiment in which eight slots 36 are used, the center of the slots are angularly displaced from one another about the outer radius of hub 28 by approximately 45°.

Further, in the preferred embodiment, clamp 38 and hub 28 are both preferably formed of stainless steel. However, any suitable material can be used, and the optimum number of slots and fingers may vary, depending on the ductility of the material in the transverse direction, the hub diameter and slot width.

Figure 5:
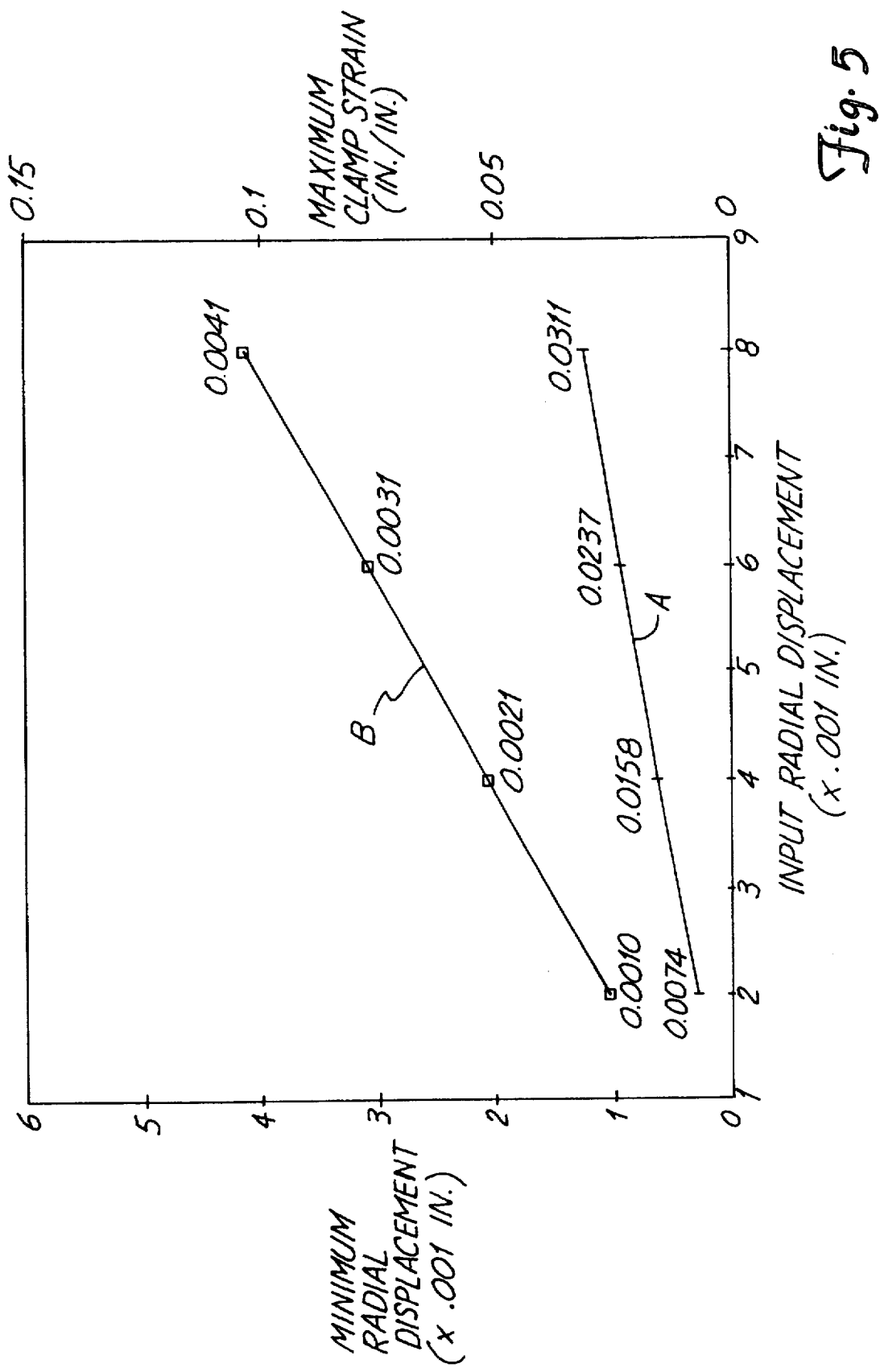
FIG. 5 is a graph of maximum clamp strain, input radial displacement and minimum clamp displacement for the hub shown in FIGS. 3 and 4 in which the clamp material is the same material as that in FIGS. 1 and 2.

FIG. 5 is a plot of input radial displacement against minimum radial clamp displacement and maximum clamp strain for the embodiment of hub 28 and clamp 38 shown in FIGS. 3 and 4. With eight slots 36, only 0.004 inches of input radial displacement is required by the fingers of the removal tool to achieve a minimum radial displacement of clamp 38 of 0.002 inches. This is achieved with a maximum strain in clamp 38 of 1.6%. Since the maximum radial interference between clamp 38 and hub 28 is only 0.0015 inches, the eight slot embodiment shown in FIGS. 3 and 4 provides a system which enables reliable removal of clamp 38 with very little or no likelihood that clamp 38 will break during the removal process. The maximum hoop strain, in inches per inch, is plotted along line A in FIG. 5, while the minimum radial displacement of clamp 38 is plotted along line B, for any given input radial displacement by the fingers of the removal tool.

Figure 6:
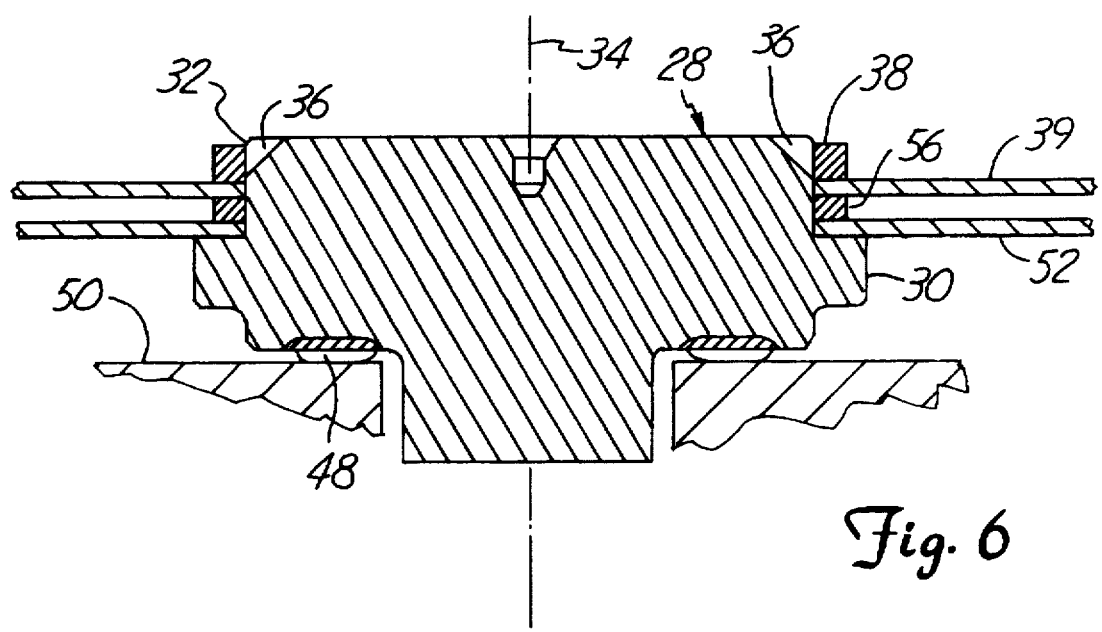
FIG. 6 is a cross-sectional view of a hub assembly according to the present invention.

FIG. 6 is a side sectional view of hub 28 taken along section line 6—6 of FIG. 3. FIG. 6 shows a plurality of discs 39 and 52 mounted generally concentrically about the outer radius of hub 28. Discs 39 and 52 are supported by flange 30, but are separated from flange 30, and separated from one another, by a spacer ring 56. In the preferred embodiment spacer ring 56 is a resilient ring generally concentrically disposed about hub 28.

During assembly, the spacer ring 56, and discs 39 and 52, are placed on hub 28 and supported by flange 30. The discs and spacer rings are then subjected to an axial load and thermally responsive clamp 38 is heated to expand so that its inner surface is just larger than the outer diameter of hub 28. Clamp 38 is placed on the first axial end 32 of hub 28 and allowed to cool. Upon cooling, clamp 38 shrinks to its original size in which its interior surface is slightly smaller than the exterior surface of hub 28. Clamp 38 thus forms an interference fit with hub 28. The axial load applied to discs 39 and 52, and spacers 54 and 56, is retained until the interference fit is formed between clamp 38 and hub 28. Thus, clamp 38 retains at least a portion of the axial load to clamp discs 39 and 52 to flange 30 for rotation with hub 28. In the preferred embodiment, hub 28 and clamp 38 are sized such that the maximum radial interference between hub 28 and clamp 38 is approximately 0.0015 inches.

FIGS. 7, 7A and 7B illustrate a hand removal tool in accordance with the present invention. Similar items are similarly numbered in the figures. In removing clamp 38 from hub 28, it is important to avoid exerting either radial or axial forces on hub 28. Even small forces exerted on hub 28 can damage the bearing which hub 28 rotates on. Thus, axial or radial forces exerted in the system must be offset by opposing axial or radial forces so no forces are exerted on hub 28.

FIG. 7 shows the hub assembly of FIG. 6 with eight removal fingers 60 positioned to mate with slots 36 in the first axial end 32 of hub 28. While fingers 60 are formed as part of a larger removal tool, fingers 60 are shown with portions of the removal tool cut away for the sake of clarity. Fingers 60 each have a first major surface 62 and a second major surface 64. A pivot pin 66 is disposed within a pair of apertures 68 and 70 in the major surfaces 62 and 64, respectively. Pivot pin 66 is preferably secured within apertures 68 and 70 with an adhesive or weld, or another suitable connection. Alternatively, pin 66 is formed integrally with the remainder of finger 60.

Each of the fingers 60 is also provided with a first tapered surface 72 and a second tapered surface 74. Tapered surfaces 72 are used in conjunction with the remainder of the removal tool which will be described with respect to FIG. 7B. Tapered surfaces 74 taper to a slot engaging portion which mates with slots 36 in hub 28.

FIG. 7A shows fingers 60 of FIG. 7 assembled within finger retaining hub 76. Finger retaining hub 76 has a plurality of wedge-shaped extremities 78 which extend radially outwardly from a central portion of finger retaining hub 76. Wedge-shaped extremities 78 include slots for receiving pivot pins 66 and pivotally hold pivot pins 66 to allow pivoting of fingers 60 about pivot pins 66 relative to wedge-shaped extremities 78. Thus, when the upper portion of fingers 60 move radially inward, the slot engaging portions of fingers 60, which mate with slots 36, move radially outward against clamp 38. FIG. 7A also shows that hub 76 has an internal axial bore 77 which has a generally cylindrical threaded interior surface.

FIG. 7B shows the entire removal tool 80 completely assembled (and in partial section), except that a portion of wedge-shaped extremities 78 are cut away for the sake of clarity. FIG. 7B better shows the slots in wedge-shaped extremities 78 which receive pivot pins 66 and hold them so that fingers 60 are in pivotal relationship to the wedge-shaped extremities 78. FIG. 7B also shows that a cylindrical cap 82 has a bore 84 which communicates with threaded bore 77 on hub 76. Cap 82 also includes an inner conical surface (not shown) which engages tapered surfaces 72 of fingers 60. On top of cap 82, a pair of crossbars 84 and 86 are connected to a threaded shaft 88 that extends through bore 84 in cap 82 and threadably mates with threaded bore 77 in hub 76. Crossbars 84 and 86 can be formed separately or integrally with one another and are connected to shaft 88 preferably by a screw 90. Crossbars 84 and 86 ride on bearing 92 over cap 82. Bearing 92 is preferably a ball bearing assembly.

As crossbars 84 and 86 are turned clockwise, the threaded shaft 88 is drawn within the threaded bore 77 of hub 76. This causes the angular inner surface of cap 84 to exert a radial force on the upper tapered surfaces 72 of fingers 60, thus casing fingers 60 to pivot about pivot points 66. This pivoting motion causes the lower tapered surfaces 74 of fingers 60 to move radially outwardly in slots 36 against the inner surface of clamp 38. As the operator continues to turn crossbars 84 and 86, radial displacement is applied to clamp 38 without applying any forces to hub 28. The removal tool of the present invention has eight fingers for removing a clamp from a disc drive which has a hub with a diameter of approximately 0.78 inches. Thus, clamp 38 is easily removed without breaking.

FIG. 8 shows a second embodiment of a removal tool according to the present invention. The tool shown in FIG. 8 includes a plurality of fingers 100 each of which have a lower tapered surface 74 similar to that on fingers 60 shown in FIGS. 7–7B. However, rather than having threaded shaft 88, and cap 80, to cause radial displacement of fingers 100 in slots 36, the removal tool shown in FIG. 8 includes removal member 102 which is positioned in abutment with tapered surfaces 74 of lingers 100. Removal member 102 is coupled to a pneumatic actuator 104. Pneumatic actuator 104, when actuated, exerts an upward force (as shown in FIG. 8) on removal ring 102. This upward force causes ring 102 to exert a force directed radially outwardly against tapered surfaces 74 of fingers 100. This accomplishes the same radial displacement as the tool shown in FIGS. 7–7B. However, the pneumatic actuator 104 provides automated movement, and the exertion of a precise radial force which is not easily provided with the hand removal tool 80. As with removal tool 80, the removal tool shown in FIG. 8 removes clamp 38 without exerting any axial or radial force on hub 28.

CONCLUSION

The present invention uses computerized finite element analysis to determine a minimum number of slots in the first axial end of the hub, and a corresponding number of fingers in the removal tool, required to remove the clamp from the hub without breaking the clamp. The number of slots and fingers is selected, based on finite element analysis, such that the input radial displacement applied by fingers 60 causes a minimal radial displacement of the clamp which is greater than the maximum interference between the hub and the clamp, while maintaining a low enough strain in the material used as the clamp to avoid breakage during removal. In the preferred embodiment in which the clamp is formed of stainless steel, and in which the hub has a diameter of approximately 0.78 inches, the maximum interference between the hub and the clamp is approximately 0.0015 inches. Thus, the present invention provides at least seven slots in the hub, and seven fingers on the removal tool, in order to achieve a maximum radial displacement of the clamp in excess of 0.0015 inches, while maintaining a strain in the clamp of less than 10%. This provides a very high likelihood that the clamp will be removed without breaking and contaminating the remainder of the disc drive.

Any practical and easily manufactured number of slots and fingers can be used in excess of the minimum number determined during non-linear stress analysis on the clamp, accounting for the material yield characteristics. However, if many more slots and fingers are used than necessary, this increases the cost of the hub due to increased machining time and cost, and it also increases the cost of the removal tool due to excess fingers. In addition, excess slots in the hub can undesirably reduce the radial clamping force exerted by the clamp due to lowered surface area forming the interference fit between the clamp and the hub.

It should also be noted that the number of slots may change, depending upon the dimension of the slots and the hub diameter. However, this minimum number will be reflected in the finite element, nonlinear stress analysis performed.

Further, it should be noted that, for the sake of the present invention, the term slot is defined to mean any suitably sized depression or channel, or other opening, in the first axial end of the hub which communicates with the clamp and which mates with an adequate number of fingers in the removal tool. While the slots shown are generally rectangular in shape, any suitable shape which is mateable with the finger to provide adequate surface area for exerting radial displacement against the clamp may be used.

Although the present invention has been described with reference to preferred embodiments, workers skilled in the art will recognize that changes may be made in form and detail without departing from the spirit and scope of the invention.

What is claimed is:

1. A hub in a disc drive, the hub for receiving a heat shrink clamp and having a magnetic disc concentrically mounted about the hub for rotation with the hub, the hub comprising:

a generally cylindrical body portion having a first axial end, a second axial end and a generally cylindrical surface extending between the first and second axial ends;

a flange disposed generally at the second axial end of the hub, the flange supporting the magnetic disc; and wherein the body portion of the hub includes at least seven slots angularly spaced from one another about the first axial end of the body portion.

2. The hub of claim 1 wherein the slots are spaced at equal distances from one another about the first axial end of the body portion.

3. The hub of claim 1 having eight slots angularly spaced from one another, at equal distances from one another, about the first axial end of the body portion.

4. The hub of claim 1 wherein the body portion and the flange are integral with one another.

5. The hub of claim 1 wherein the first axial end of the hub generally defines an end plane, and wherein the slots extend radially outward from an inner radius of the first axial end and axially away from the end plane at an angle of approximately forty five degrees.

6. A hub assembly in a magnetic disc drive, the hub assembly comprising:

a hub having a first axial end, a second axial end, a body portion extending between the first and second axial ends, and a flange disposed generally at the second axial end of the hub;

a magnetic disc, concentrically disposed about the body portion of the hub and supported by the flange;

a clamp having an inner surface, the clamp generally concentrically disposed about the body portion of the hub proximate the first axial end of the hub and removably attached to the hub by a radial interference between the hub and the clamp which is no greater than a maximum radial interference, the clamp and the flange subjecting the disc to opposing axial forces to clamp the disc for rotation with the hub; and wherein the first axial end of the hub includes a sufficient number of spaced-apart slots communicating with an inner surface of the clamp such that the clamp is removable by applying a radial force directed outwardly to the inner surface of the clamp through the slots to attain a minimum radial displacement of the clamp, wherein the clamp can be removed from the hub, which exceeds the maximum radial interference between the hub and the clamp and such that strain induced in the clamp is less than a predetermined percent upon being radially displaced by the minimum radial displacement.

7. The hub assembly of claim 6 wherein the number of slots is sufficient so the strain is less than approximately ten percent.

8. The hub assembly of claim 6 wherein the number of slots comprises at least seven.

9. The hub assembly of claim 8 wherein the slots are angularly spaced about the first end of the hub at equal intervals.

10. The hub assembly of claim 9 wherein the number of slots comprises at least eight.

11. The hub assembly of claim 6 wherein the first axial end of the hub generally defines a plane and wherein the slots extend radially outwardly from an inner radius of the first axial end of the hub and extend axially away from the plane at an angle.

12. The hub assembly of claim 11 wherein the angle is approximately forty five degrees relative to the plane.

13. The hub assembly of claim 6 and further comprising:

a plurality of discs generally concentrically disposed about the hub; and spacer means spacing the plurality of discs from one another, the plurality of discs and the spacer means being supported by the flange and being clamped to the hub by the opposing axial forces.

14. A method of making a hub assembly for use in a disc drive, comprising:

forming a hub having first and second axial ends and a flange disposed about the second axial end, the hub including a number of slots in the first axial end;

placing a disc generally concentrically about the hub so the disc is supported by the flange;

placing a clamp about the first axial end of the hub to clamp the disc to the flange, the clamp having an inner surface contacting the hub to form an interference fit with the hub, wherein the clamp is removably attached to the hub by a radial interference between the hub and the clamp which is no greater than a maximum radial interference, and wherein the slots communicate with the inner surface of the clamp;

the clamp being removable by insertion of removal fingers into the slots and application of a radial displacement, with the removal fingers, to the inner surface of the clamp through the slots, and wherein forming the hub includes:

determining the number of slots required in the first axial end of the hub such that, during removal of the clamp, a minimum radial displacement of the clamp exceeds the maximum radial interference between the hub and clamp and such that the applied radial displacement induces no more than a predetermined strain in the clamp; and forming the number of slots in the first axial end of the hub.

15. The method of claim 14 wherein determining comprises:

determining the number of slots such that the applied radial displacement induces a strain in the clamp of less than ten percent.

16. The method of claim 14 and further comprising:

placing a plurality of discs concentrically about the hub; and placing spacer means about the hub to space the plurality of discs from one another.

17. The method of claim 16 wherein forming at least seven slots comprises:

spacing the slots at equal distances from one another.

18. The method of claim 14 wherein forming the number of slots comprises:

forming at least seven slots angularly spaced about the first axial end of the hub.

19. A method of removing a thermally responsive clamp from a hub in a disc drive wherein the clamp is connected to the hub by a radial interference between the hub and the clamp which is no greater than a maximum radial interference, the method comprising:

applying a radial force to the clamp through a sufficient number of a plurality of slots, defined by the hub and communicating with the clamp, such that a minimum radial displacement of the clamp is achieved which exceeds the maximum radial interference between the hub and the clamp, the radial force being applied through a sufficient number of slots so that strain induced in the clamp is less than a predetermined percent upon being radially displaced by the minimum radial displacement.

20. The method of claim 19 wherein applying comprises:

applying the radial force through at least seven grooves such that the strain induced in the clamp is less than ten percent.

* * * * *